(12) United States Patent
Alidio

(10) Patent No.: US 11,483,041 B2
(45) Date of Patent: Oct. 25, 2022

(54) HIGH FREQUENCY COMPONENT ISOLATION FOR WIRELESS AND RADAR SYSTEMS

(71) Applicant: Metawave Corporation, Palo Alto, CA (US)

(72) Inventor: Raul Inocencio Alidio, Carlsbad, CA (US)

(73) Assignee: METAWAVE Corporation, Carlsbad, CA (US)

( * ) Notice: Subject to any disclaimer, the term of this patent is extended or adjusted under 35 U.S.C. 154(b) by 593 days.

(21) Appl. No.: 16/443,831

(22) Filed: Jun. 17, 2019

(65) Prior Publication Data

US 2019/0383898 A1 Dec. 19, 2019

Related U.S. Application Data

(60) Provisional application No. 62/685,861, filed on Jun. 15, 2018.

(51) Int. Cl.
*H04B 7/06* (2006.01)
*G01S 7/03* (2006.01)
(Continued)

(52) U.S. Cl.
CPC .......... *H04B 7/0617* (2013.01); *G01S 7/0236* (2021.05); *G01S 7/032* (2013.01);
(Continued)

(58) Field of Classification Search
CPC ..... H04B 7/0617; H04B 7/086; G01S 7/0236; G01S 7/032; G01S 7/023; G01S 13/931; G01S 7/415; G01S 7/417; G01S 13/584; G01S 2013/9316; G01S 2013/9322; G01S 2013/9323; G01S 2013/9325; G01S 2013/93271; G01S 13/865; G01S 13/867; H01Q 15/0086; H01Q 1/3233; H01Q 3/36;
(Continued)

(56) References Cited

U.S. PATENT DOCUMENTS 6,016,122 A * 1/2000 Malone .................... H01Q 3/46
333/159
7,916,083 B2 * 3/2011 Thiesen ............... H01Q 3/2605
342/372
(Continued)

*Primary Examiner* — Donald H B Braswell
(74) *Attorney, Agent, or Firm* — Sandra Lynn Godsey

(57) ABSTRACT

Examples disclosed herein relate to a high frequency component isolation for wireless and radar systems. The disclosure herein includes a radar system that has an array of radiating elements and a phase control module coupled to the array of radiating elements. The phase control module is configured to isolate one or more transmission signal paths through the phase control module from at least one conductor electrically coupled to one or more active circuits in the phase control module, the at least one conductor proximate to the one or more transmission signal paths. The phase control module is configured to adjust a reactance in a transmission signal propagating through the isolated one or more transmission signal paths to one or more radiating elements of the array of radiating elements. Other examples disclosed herein include beamforming system with high frequency component isolation and a method of beamforming with high frequency component isolation.

16 Claims, 9 Drawing Sheets

(51) Int. Cl.
  *H01Q 3/34* (2006.01)
  *G01S 7/02* (2006.01)
  *G01S 13/931* (2020.01)

(52) U.S. Cl.
  CPC ............... *H01Q 3/34* (2013.01); *G01S 7/023* (2013.01); *G01S 13/931* (2013.01)

(58) Field of Classification Search
  CPC .... H01Q 3/42; H01Q 21/0006; H01Q 21/005; H01P 1/18
  See application file for complete search history.

(56) References Cited

U.S. PATENT DOCUMENTS

| | | | |
|---|---|---|---|
| 2002/0132581 A1* | 9/2002 | Ichihara | H01Q 19/32 455/25 |
| 2008/0102760 A1* | 5/2008 | McConnell | H04B 7/0848 455/73 |
| 2008/0150800 A1* | 6/2008 | Tsuji | H01Q 25/00 342/368 |
| 2016/0011307 A1* | 1/2016 | Casse | H01Q 15/148 701/93 |

* cited by examiner

HIGH FREQUENCY COMPONENT ISOLATION FOR WIRELESS AND RADAR SYSTEMS

CROSS-REFERENCE TO RELATED APPLICATIONS

This application claims priority from U.S. Provisional Application No. 62/685,861, titled "HIGH FREQUENCY COMPONENTS FOR WIRELESS AND RADAR SYSTEM," filed on Jun. 15, 2018, and incorporated herein by reference in its entirety.

BACKGROUND

Wireless systems operate over a range of frequencies. Each frequency range has its own requirements for operation with desired performance. For example, millimeter wavelength applications have emerged to address the need for higher bandwidth and data rates. The millimeter wavelength spectrum covers frequencies between 30 GHz and 300 GHz and is able to reach data rates of 10 Gbits/s or more with wavelengths in the 1 to 10 mm range. The shorter wavelengths have distinct advantages, including better resolution, high frequency reuse and directed beamforming that are critical in wireless communications and autonomous driving applications. The shorter wavelengths are, however, susceptible to high atmospheric attenuation and have a limited range (just over a kilometer).

In many of these applications, phase shifters are needed to achieve a full range of phase shifts to direct beams to desired directions. Designing millimeter wave phase shifters is challenging as losses must be minimized in miniaturized circuits while providing phase shifts anywhere from 0 to 360°. The circuits and systems designed for one frequency may perform poorly at other frequencies, such as with the introduction of losses, parasitic effects, and so forth.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and wherein.

DETAILED DESCRIPTION

Figure 1:
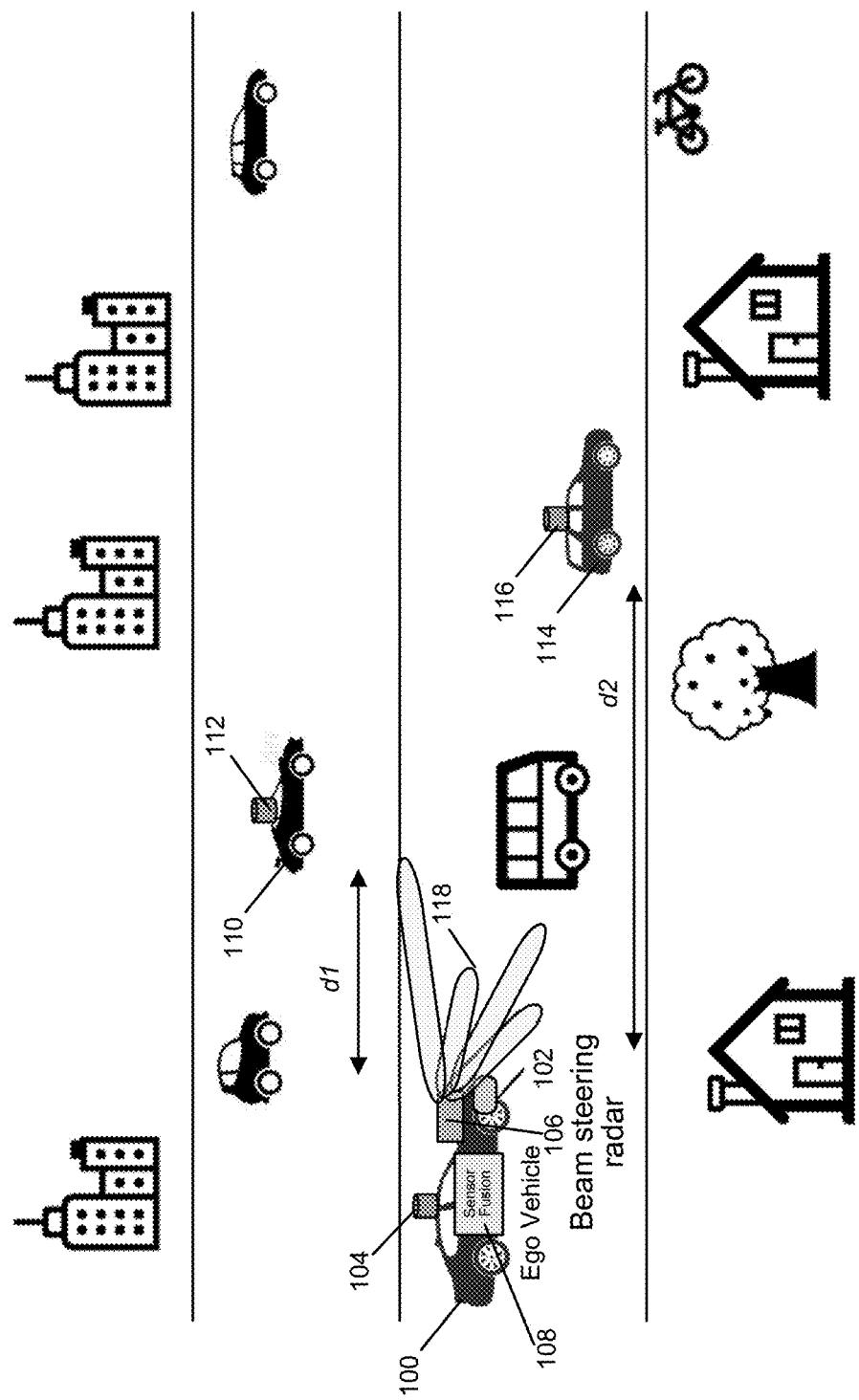
FIG. 1 illustrates an example environment in which high frequency component isolation for a beam steering radar system in an autonomous vehicle may be implemented.

The present application relates to wireless communications and antenna structures for transmitting and receiving signals. In particular, the present application relates to high frequency component isolation for radar systems and advanced communications systems.

Wireless systems have both transmission and reception modules, such as to detect a target with a radar system and to send and receive communications with a cellular system. Beamforming is used to change the transmit and receive radiation signals. These systems have multiple antenna elements spaced according to the wavelength of the processed signals, in which the antenna elements are controlled so that signals received at each antenna element has a phase relationship to other elements. This phase relationship may indicate a phase difference that controls the direction of the radiated beam. In many wireless communication systems, there is a uniform phase difference that increases from one antenna element to another.

Antenna performance in resolution, range and field of view is becoming a critical focus of design and implementation of antenna technologies. This is due in large part to the ubiquity of wireless communications, the specifications of new wireless communication standards and technologies, such as 5G cellular, and to advances in automation for automotive technologies, in particular, autonomous vehicles and driver-assist technology.

Beamforming and beam steering are utilized to direct signals from individual antennas over a desired Field-of-View (FoV). For radar, this means the area within which the radar can detect objects, or targets. In wireless communications, this means the area within which a user (referred to as having User Equipment (UE)) is detected and a communication is maintained, such as to track a UE. As automation at driving speeds and movement of UEs become more prevalent in cities, around buildings and so forth, such technology may require that the antenna system can steer the beam and adjust (or modify) the beamform rapidly. In many applications, these changes are done in microseconds, such as when a car is driving at 80 miles per hour, or 50 km per hour. Additionally, these antennas are to perform well in a variety of environments, including weather conditions and infrastructures.

This often requires complex circuitry formed in multiple layers of substrates, wherein electrical lines, transmission lines and components are positioned in close proximity. Miniaturization is a process of using less space for these various parts of circuitry, and often introduces unwanted effects, such as the introduction of losses, degraded performance, parasitic effects and so forth. When these miniaturized, condensed circuits are to operate at high frequencies than they were originally designed, such as at 77 GHz for new automotive standards, parasitic effects are to be mitigated. Components are connected through layers in a substrate by landing pad structures, stubs or junctions. These structures may introduce parasitic capacitance, such as when they are close to a conductive layer. Often copper layers sandwich dielectric material in these structures.

The present disclosure provides for isolating high frequency components from parasitic effects, such as parasitic capacitance and so forth, when Radio Frequency (RF) circuits are pushed to higher frequencies. A phase shifter with high frequency component isolation for millimeter wave applications is disclosed. The phase shifter may be capable of generating continuous phase shifts of anywhere from 0 to 360° with the use of high frequency component isolation capable of operating in millimeter wave frequencies. The phase shifter is designed in a robust topology with low amplitude variation over phase, minimized ESD effects and a small MIMIC layout size that makes it desirable for many millimeter wave applications, such as wireless communications, Advanced Driver Assistance Systems (ADAS), and autonomous driving.

In particular, the phase shifter with high frequency component isolation described herein enables fast scans of up to 360° of an entire environment in a fraction of time of current autonomous driving systems, and with improved performance, all-weather/all-condition detection, advanced decision-making and interaction with multiple vehicle sensors through sensor fusion. The examples described herein provide enhanced phase shifting of a transmitted RF signal to achieve transmission in the autonomous vehicle range at a millimeter wavelength that corresponds to a frequency of 77 GHz, which may be in a range of 76 GHz to 81 GHz.

FIG. 1 illustrates an example environment in which high frequency component isolation for a beam steering radar system in an autonomous vehicle may be implemented. Ego vehicle 100 is an autonomous vehicle having multiple perception sensors, including camera 102, lidar 104, and a beam steering radar system 106, among others. The beam steering radar system 106 may be utilized for transmitting a radar signal to scan a FoV or specific area. The entire FoV or a portion of it can be scanned by a compilation of such transmission beams 118, which may be in successive adjacent scan positions or in a specific or random order. As used herein, the term "FoV" refers to the radar transmissions and does not imply an optical FoV with unobstructed views. The scan parameters may also indicate the time interval between these incremental transmission beams, as well as start and stop angle positions for a full or partial scan.

Camera sensor 102 may be used to detect visible targets and conditions and to assist in the performance of various functions. The lidar sensor 104 can also be used to detect targets outside the ego vehicle 100 and provide this information to adjust control of the vehicle. This information may include information such as congestion on a highway, road conditions, and other conditions that would impact the sensors, actions or operations of the vehicle. Camera sensors are currently used in ADAS to assist drivers in driving functions such as parking (e.g., in rear view cameras). Cameras can capture texture, color and contrast information at a high level of detail, but similar to the human eye, they are susceptible to adverse weather conditions and variations in lighting. Camera 102 may have a high resolution but may not capture images of targets beyond 50 meters. Lidar sensors measure the distance to an object by calculating the time taken by a pulse of light to travel to an object and back to the sensor. When positioned on top of a vehicle, lidar sensors can provide a 360° three-dimensional ("3D") view of the surrounding environment. However, lidar sensors, such as lidar 104, are still prohibitively expensive, bulky in size, sensitive to weather conditions and are limited to short ranges (e.g., less than 150-200 meters), with resolution decreasing with range. Radar sensors, on the other hand, have been used in vehicles for many years and operate in all-weather conditions. Radar sensors also use far less processing than the other types of sensors and have the advantage of detecting targets behind obstacles and determining the speed of moving targets.

In various examples and as described in more detail below, radar 106 is an Intelligent Metamaterial (iMTM) radar system capable of providing a 360° true 3D vision and human-like interpretation of the ego vehicle's path and surrounding environment. The iMTM radar system is capable of shaping and steering radio frequency (RF) beams in all directions in a 360° FoV and recognizing targets quickly with a high degree of accuracy over a long range of around 300 meters or more. The short-range capabilities of camera 102 and lidar 104 and the long-range capabilities of radar 106 enable a sensor fusion module 108 in ego vehicle 100 to enhance its target detection and identification capabilities.

Target detection and identification is also enhanced with sensor fusion module 108 using data received from other autonomous vehicles. For example, a lead vehicle 110 with a lidar 112 may be placed along the path of ego vehicle 100 and at a distance d1 away from it. Lead vehicle lidar 112 has a short range as indicated in FIG. 1 that may complement the short range of the ego vehicle lidar 104. Autonomous Vehicle (AV) 114 is also shown at a distance d2 away from the ego vehicle 100. AV 114 includes AV lidar 116, which has a similar short range to lead vehicle lidar 112 and ego vehicle lidar 104. It is noted that d1 and d2 can be adjusted as desired throughout data gathering by ego vehicle 100, lead vehicle 110 and AV vehicle 114. It is also noted that ego vehicle 100 may rely on multiple lead and autonomous vehicles in geographically disparate positions to assist its understanding of its surrounding environment.

In various examples, lidars 104, 112 and 116 can all be used to complement the information acquired by radar 106 and camera 102 and improve the performance of an autonomous driving system in ego vehicle 100. The autonomous driving system may rely on the use of an iMTM radar (e.g., radar 106) with machine and deep learning capabilities. The system benefits from the sensor fusion of geographically disparate sensors for training its machine and deep learning networks and improving their training and perceptual inference performance.

Figure 2:
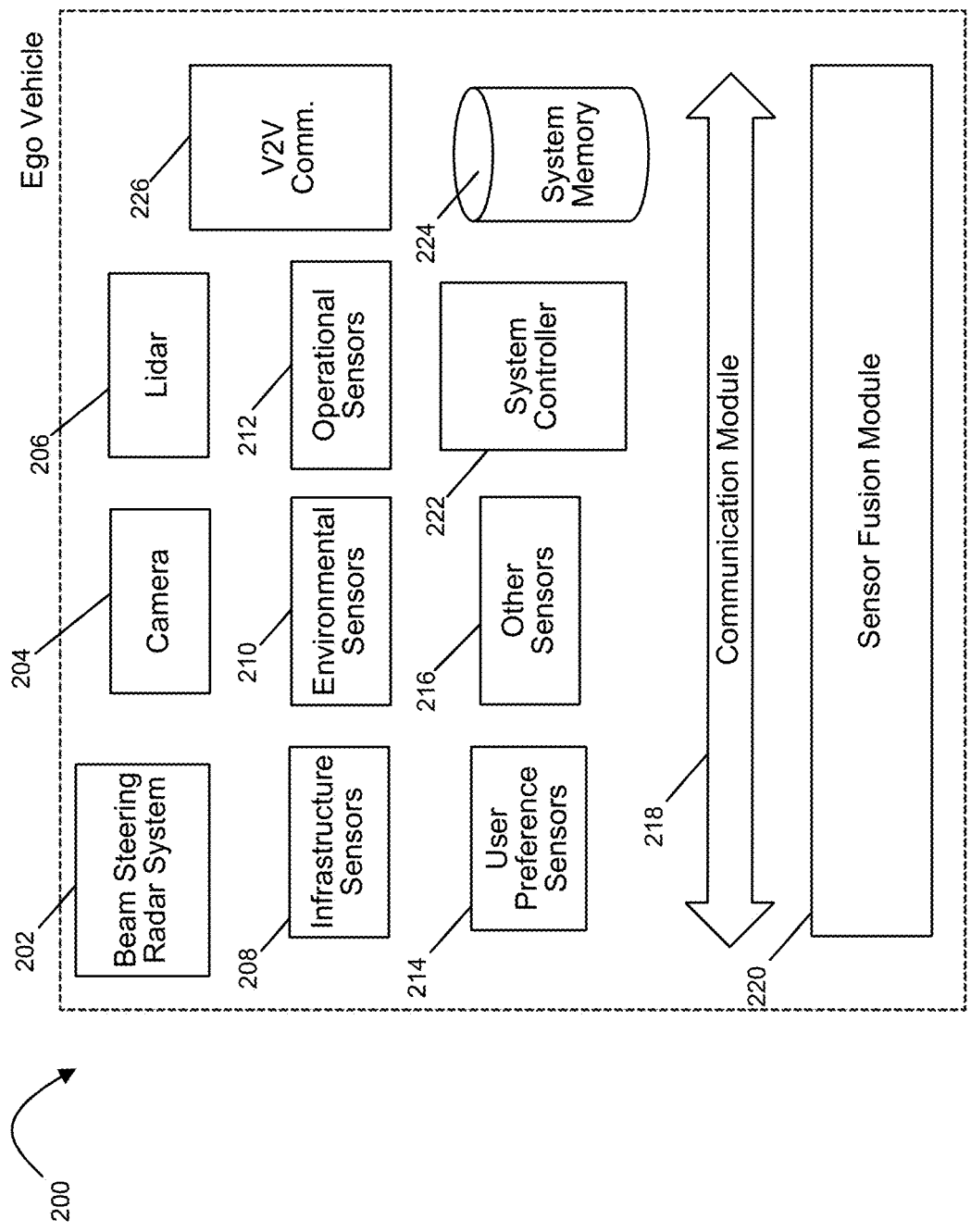
FIG. 2 illustrates a schematic diagram of an example of an autonomous driving system for an ego vehicle, according to implementations of the subject technology.

A schematic diagram of an autonomous driving system 200 for an ego vehicle in accordance with various examples is illustrated in FIG. 2. Autonomous driving system 200 is a system for use in an ego vehicle that provides partial or full automation of driving functions. The driving functions may include, for example, steering, accelerating, braking, and monitoring the surrounding environment and driving conditions to respond to events, such as changing lanes or speed when needed to avoid traffic, crossing pedestrians, animals, and so on. The autonomous driving system 200 includes a beam steering radar system 202 and other sensor systems such as camera 204, lidar 206, infrastructure sensors 208, environmental sensors 210, operational sensors 212, user preference sensors 214, and other sensors 216. Autonomous driving system 200 also includes a communications module 218, a sensor fusion module 220, a system controller 222, a system memory 224, and a V2V communications module 226. It is appreciated that this configuration of autonomous driving system 200 is an example configuration and not meant to be limiting to the specific structure illustrated in FIG. 2. Additional systems and modules not shown in FIG. 2 may be included in autonomous driving system 200.

Figure 4:
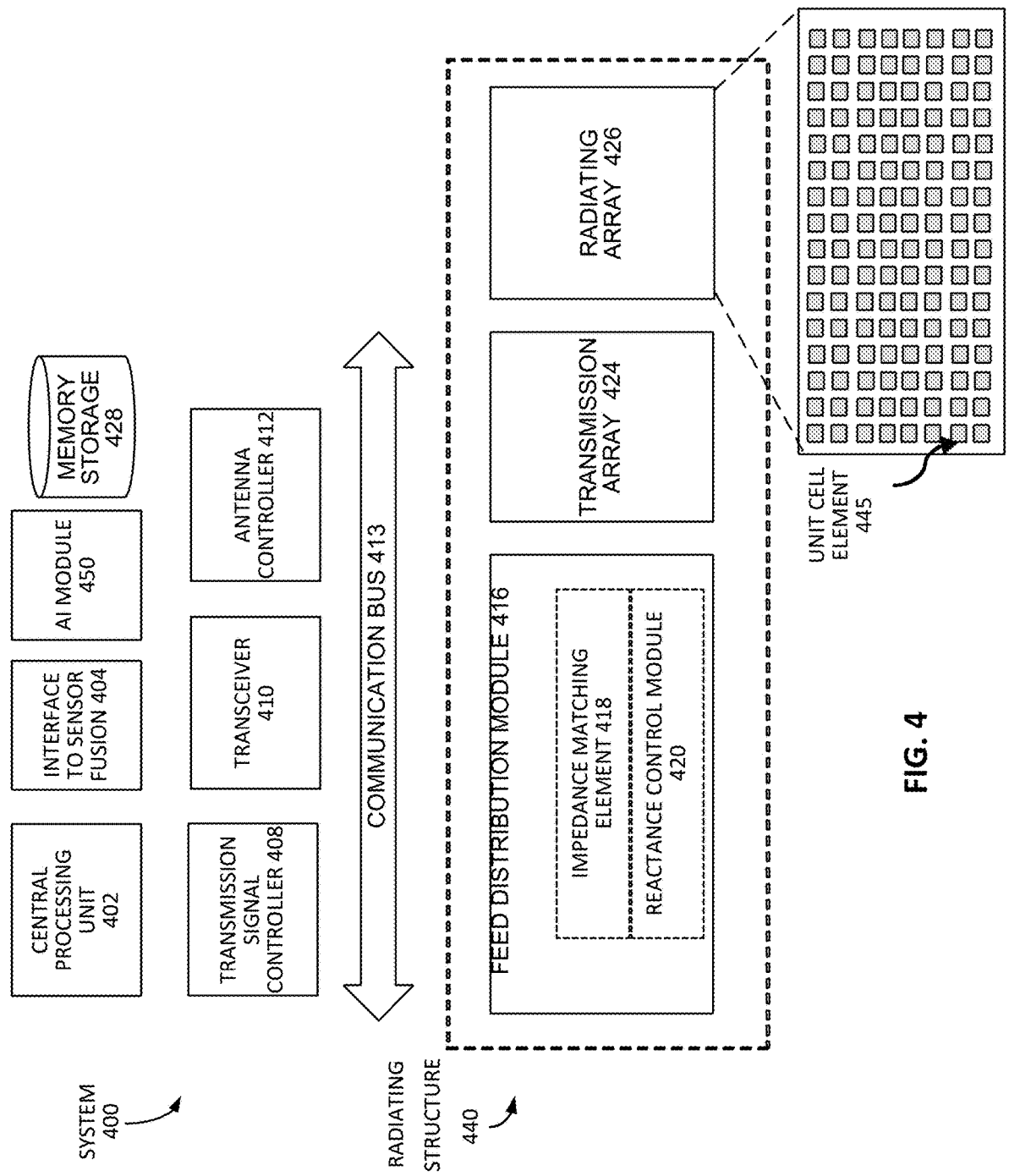
FIG. 4 illustrates an antenna system for high frequency operation, according to implementations of the subject technology.

The beam steering radar system 202 includes an iMTM antenna module (described in more detail below with reference to FIGS. 4 and 5) for providing dynamically controllable and steerable beams that can focus on one or multiple portions of a 360° FoV of the vehicle. The beams radiated from the iMTM antenna module are reflected from targets in the vehicle's path and surrounding environment and received and processed by the beam steering radar system 202 to detect and identify the targets. The beam steering radar system 202 also has an iMTM perception module as shown in FIG. 4 that is trained to detect and identify targets and control the iMTM antenna module as desired. Camera sensor 204 and ego lidar 206 are also used to detect targets in the path and surrounding environment of the ego vehicle, albeit in a much lower range. In some implementations, the beam steering radar system 202 includes a phase shifting control module with high frequency component isolation for providing phase shifting to transmission lines while mitigating parasitic effects on the transmission lines.

Infrastructure sensors 208 may provide information from infrastructure while driving, such as from a smart road configuration, billboard information, traffic alerts and indicators, including traffic lights, stop signs, traffic warnings, and so forth. This is a growing area, and the uses and capabilities derived from this information are immense. Environmental sensors 210 detect various conditions outside, such as temperature, humidity, fog, visibility, precipitation, and so forth. Operational sensors 212 provide information about the functional operation of the vehicle. This may be battery charge level, tire pressure, fuel levels, brake wear, and so forth. The user preference sensors 214 may be configured to detect conditions that are part of a user preference. This may be temperature adjustments, smart window shading, and so forth. Other sensors 216 may include additional sensors for monitoring conditions in and around the vehicle.

In various examples, the sensor fusion module 220 optimizes these various functions to provide an approximately comprehensive view of the vehicle and environments. Many types of sensors may be controlled by the sensor fusion module 220. These sensors may coordinate with each other to share information and consider the impact of one control action on another system. In one example, in a congested driving condition, a noise detection module (not shown) may identify that there are multiple radar signals that may interfere with the vehicle. This information may be used by an iMTM perception module in autonomous driving system 200 to adjust the beam size of the iMTM antenna module to avoid these other signals and minimize interference.

In another example, environmental sensor 210 may detect that the weather is changing, and visibility is decreasing. In this situation, the sensor fusion module 220 may determine to configure the other sensors to improve the ability of the vehicle to navigate in these new weather conditions. The configuration may include turning off one or more sensors, such as camera 204 and/or lidar 206 or reducing the sampling rate of these visibility-based sensors. This effectively places reliance on the sensor(s) adapted for the current situation. In response, the iMTM perception module configures the beam steering radar system 202 for these conditions as well. For example, the beam steering radar system 202 may reduce the beam width to provide a more focused beam, and thus a finer sensing capability.

In various examples, the sensor fusion module 220 may send a direct control signal to the iMTM antenna module based on historical conditions and controls. The sensor fusion module 220 may also use some of the sensors within autonomous driving system 200 to act as feedback or calibration for the other sensors. In this way, an operational sensor 212 may provide feedback to the iMTM perception module and/or the sensor fusion module 220 to create templates, patterns and control scenarios. These are based on successful actions or may be based on poor results, where the sensor fusion module 220 learns from past actions.

Data from sensors 202-216 may be combined in sensor fusion module 220 to form fused sensor data that improves the target detection and identification performance of autonomous driving system 200. Sensor fusion module 220 may itself be controlled by system controller 222, which may also interact with and control other modules and systems in the vehicle. For example, system controller 222 may turn on and off the different sensors 202-216 as desired, or provide instructions to the vehicle to reduce velocity or stop upon identifying a driving hazard (e.g., deer, pedestrian, cyclist, or another vehicle suddenly appearing in the vehicle's path, flying debris, etc.)

All modules and systems in autonomous driving system 200 communicate with each other through communication module 218. Autonomous driving system 200 also includes system memory 224, which may store information and data (e.g., static and dynamic data) used for operation of autonomous driving system 200 and the ego vehicle using autonomous driving system 200. V2V communication module 226 is used for communication with other vehicles, including a lead vehicle (e.g., 110) and an AV vehicle (e.g., 114). The V2V communications between the ego vehicle and the lead and AV vehicles include data received from lead vehicle lidar 228 and AV lidar 230, respectively. The data received is processed by sensor fusion module 220 to assist in the training and perceptual inference performance of the iMTM perception module in the ego vehicle. The V2V communications may also include information from other vehicles that is invisible to the user, driver, or rider of the vehicle, and may help vehicles coordinate to avoid an accident.

Figure 3:
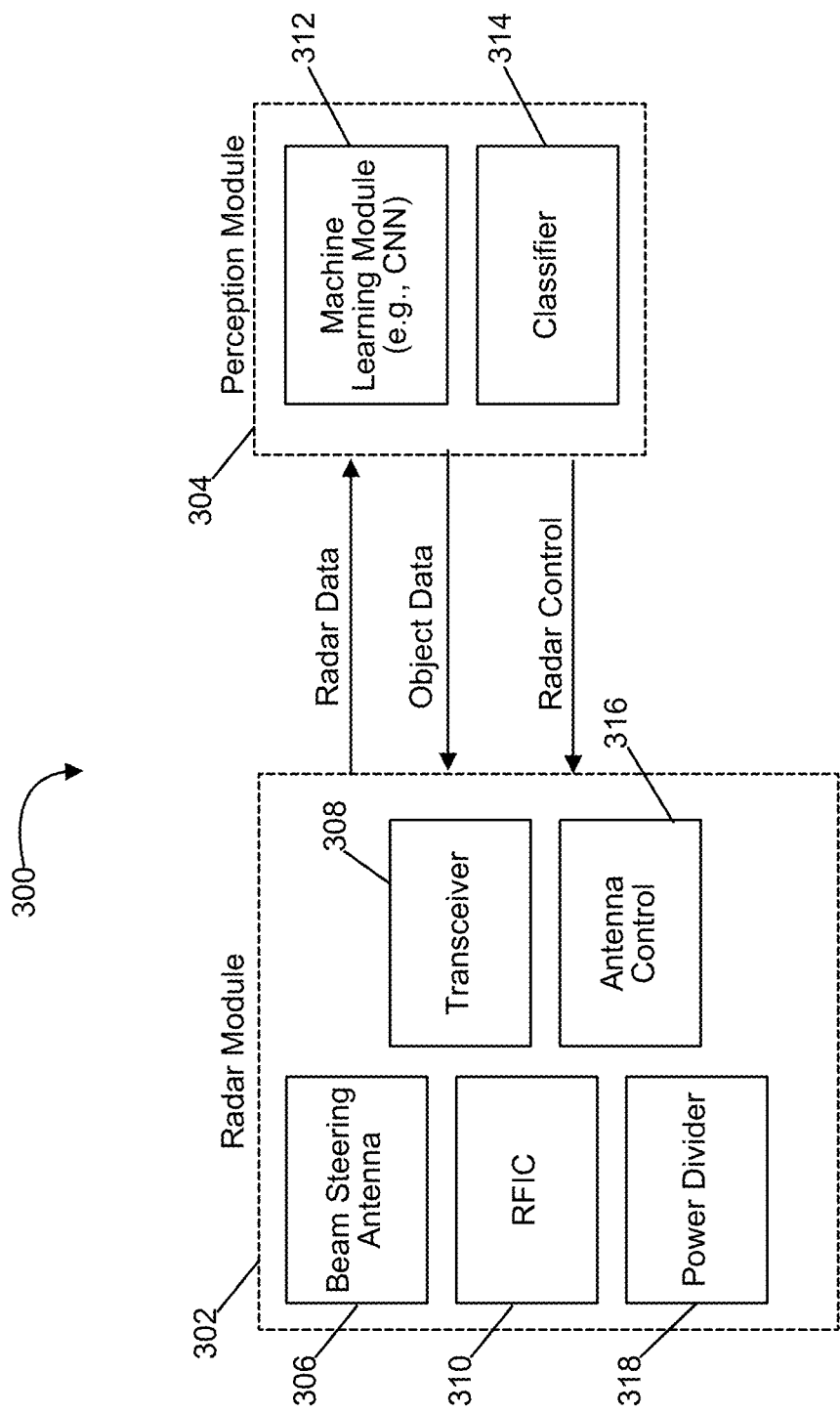
FIG. 3 illustrates a schematic diagram of a beam steering radar system, according to implementations of the subject technology.

FIG. 3 illustrates a schematic diagram of a beam steering radar system 300 in accordance with various examples. The beam steering radar system 300 is a "digital eye" with true 3D vision and capable of a human-like interpretation of the world. The "digital eye" and human-like interpretation capabilities are provided by two main modules: radar module 302 and a perception module 304. The radar module 302 includes at least one beam steering antenna 306 for providing dynamically controllable and steerable beams that can focus on one or multiple portions of a 360° FoV of an autonomous ego vehicle. It is noted that current beam steering antenna implementations can steer beams of up to 30-180° FoV. Multiple beam steering antennas may be needed to provide steerability to reach the full 360° FoV.

In various examples, the beam steering antenna 306 is integrated with RFIC 310 such as the phase shifters described herein for providing RF signals at multiple steering angles. In some implementations, the RFIC 310 includes a phase shifting control module with high frequency component isolation for providing phase shifting to transmission lines while mitigating parasitic effects on the transmission lines. The antenna may be a meta-structure antenna, a phase array antenna, or any other antenna capable of radiating RF signals in millimeter wave frequencies. A meta-structure, as generally defined herein, is an engineered structure capable of controlling and manipulating incident radiation at a desired direction based on its geometry. The meta-structure antenna may include various structures and layers, including, for example, a feed or power division layer 318 to divide power and provide impedance matching, an RF circuit layer with the RFIC 310 to provide steering angle control and other functions, and a meta-structure antenna layer with multiple microstrips, gaps, patches, vias, and so forth. The meta-structure layer may include a metamaterial layer. Various configurations, shapes, designs and dimensions of the beam steering antenna 306 may be used to implement specific designs and meet specific constraints.

Radar control is provided in part by the perception module 304. Radar data generated by the radar module 302 is provided to the perception module 304 for object detection and identification. The radar data is acquired by the transceiver 308, which has a radar chipset capable of transmitting the RF signals radiated by the meta-structure antenna 306 and receiving the reflections of these RF signals. Object detection and identification in perception module 304 is performed in a Machine Learning Module ("MLM") 312 and in a classifier 314. Upon identifying objects in the FoV of the vehicle, the perception module 304 provides object data and control instructions to antenna control 316 in radar module 302 for adjusting the beam steering and beam characteristics as needed.

The MLM 312, in various examples, implements a CNN that, in various examples, is a fully convolutional neural network ("FCN") with three stacked convolutional layers from input to output (additional layers may also be included in the CNN). Each of these layers also performs the rectified linear activation function and batch normalization as a substitute for traditional L2 regularization and each layer has 64 filters. Unlike many FCNs, the data is not compressed as it propagates through the network because the size of the input is relatively small and runtime requirements are satisfied without compression. In various examples, the CNN may be trained with raw radar data, synthetic radar data, lidar data and then retrained with radar data, and so on. Multiple training options may be implemented for training the CNN to achieve a good object detection and identification performance.

The classifier 314 may also include a CNN or other object classifier to enhance the object identification capabilities of perception module 304 with the use of the velocity information and micro-doppler signatures in the radar data acquired by the radar module 302. When an object is moving slowly, or is moving outside a road lane, then it most likely is not a motorized vehicle, but rather a person, animal, cyclist and so forth. Similarly, when one object is moving at a high speed, but lower than the average speed of other vehicles on a highway, the classifier 314 uses this velocity information to determine if that vehicle is a truck or another object which tends to move more slowly. Similarly, the location of the object, such as in the far-right lane of a highway in some countries (e.g., in the United States of America) indicates a slower-moving type vehicle. If the movement of the object does not follow the path of a road, then the object may be an animal, such as a deer, running across the road. All of this information may be determined from a variety of sensors and information available to the vehicle, including information provided from weather and traffic services, as well as from other vehicles or the environment itself, such as smart roads and smart traffic signs.

Note that velocity information is unique to radar sensors. Radar data is in a multi-dimensional format having data tuples of the form $(r_i, \theta_i, \phi_i, I_i, v_i)$, where $r_i, \theta_i, \phi_i$, represent the location coordinates of an object with $r_i$ denoting the range or distance between the beam steering radar system 300 and the object along its line of sight, $\theta_i$ is the azimuthal angle, and $\phi_i$ is elevation angle, $I_i$ is the intensity or reflectivity indicating the amount of transmitted power returned to the transceiver 308 and $v_i$ is the speed between the beam steering radar system 300 and the object along its line of sight. The location and velocity information provided by the perception module 304 to the radar module 302 enables the antenna control 310 to adjust its parameters accordingly.

FIG. 4 illustrates an antenna system 400 for high frequency operation, according to implementations of the subject technology. The antenna system 400 includes a central processing unit 402, an interface-to-sensor fusion 404, a transmission signal controller 408, a transceiver 410, an antenna controller 412, an Artificial Intelligence (AI) module 450, and a memory storage unit 428. The antenna system 400 is communicably coupled to a radiating structure 440 through a communication bus 413. The radiating structure 440 includes a feed distribution module 416, a transmission array structure 424, and a radiating array structure 426. The feed distribution module 416 includes an impedance matching element 418 and a Reactance Control Module (RCM) 420. Not all of the depicted components may be used, however, and one or more implementations may include additional components not shown in the figure. Variations in the arrangement and type of the components may be made without departing from the scope of the claims set forth herein. Additional components, different components, or fewer components may be provided.

As in FIG. 4, the antenna system 400 includes interfaces with other modules, such as through the interface-to-sensor fusion 404, where information is communicated between the antenna system 400 and a sensor fusion module (not shown) that is within an autonomous vehicle or is used for an Automated Driver Assistance System (ADAS). The antenna controller 412 can control the generation and reception of electromagnetic radiation, or energy beams. The antenna controller 412 determines the direction, power and other parameters of the beams and controls the radiating structure 440 to achieve beam steering in various directions. The antenna system 400 also includes modules for control of reactance, phase and signal strength in a transmission line.

The present disclosure is described with respect to a radar system, where the radiating structure 440 is a structure having a feed structure, such as the feed distribution module 416, with an array of transmission lines feeding a radiating array, such as the radiating array structure 426, through the transmission array structure 424. In some implementations, the transmission array structure 424 includes a plurality of transmission lines configured with discontinuities within the conductive material and the radiating structure 426 is a lattice structure of unit cell radiating elements proximate the transmission lines. The feed distribution module 416 may include a coupling module for providing an input signal to the transmission lines, or a portion of the transmission lines. In some implementations, the coupling module is a power divider circuit that divides the input signal among the plurality of transmission lines, in which the power may be distributed equally among the N transmission lines or may be distributed according to another scheme, such that the N transmission lines do not all receive a same signal strength.

In one or more implementations, the feed distribution module 416 incorporates a dielectric substrate to form a transmission path, such as a SIW. In this respect, the RCM 420 in the feed distribution module 416 may provide reactance control through integration with the transmission line, such as by insertion of a microstrip or strip line portion that couples to the RCM 420. The RCM 420 enables control of the reactance of a fixed geometric transmission line. In some implementations, one or more reactance control mechanisms (e.g., RCM 420) may be placed within a transmission line. Similarly, the RCM 420 may be placed within multiple transmission lines to achieve a desired result. The RCM 420 may have individual controls or may have a common control. In some implementations, a modification to a first reactance control mechanism is a function of a modification to a second reactance control mechanism.

In some implementations, the radiating structure 440 includes the power divider circuit and a control circuit therefor. The control circuit includes the RCM 420, or reactance controller, such as a variable capacitor, to change the reactance of a transmission circuit and thereby control the characteristics of the signal propagating through the transmission line. The RCM 420 acts to change the phase of a signal radiated through individual antenna elements of the radiating array structure 426. Where there is such an interruption in the transmission line, a transition is made to maintain signal flow in the same direction. Similarly, the RCM 420 may utilize a control signal, such as a Direct Current (DC) bias line or other control means, to enable the antenna system 400 to control and adjust the reactance of the transmission line. In some implementations, the feed distribution module 416 includes one or more structures that isolate the control signal from the transmission signal. In the case of an antenna transmission structure, the RCM 420 may serve as the isolation structure to isolate DC control signal(s) from Alternating Current (AC) transmission signals. In some implementations, the RCM 420 includes a phase shifting control module with high frequency component isolation for providing phase shifting to transmission lines while mitigating parasitic effects on the transmission lines.

The impedance matching element 418 is coupled to the transmission array structure 424. In some implementations, the impedance matching element 418 incorporates the RCM 420 to modify a capacitance of the radiating array structure 426. The impedance matching element 418 may be configured to match the input signal parameters with radiating elements, and therefore, there are a variety of configurations and locations for this element, which may include a plurality of components.

In one or more implementations, the impedance matching element 418 includes a directional coupler having an input port to each of the adjacent transmission lines. The adjacent transmission lines and the impedance matching element 418 form a super element, in which the adjacent transmission line pair has a specific phase difference, such as a 90-degree phase difference with respect to each other.

The transmission line may have various portions, in which a first portion receives an transmission signal as an input, such as from a coaxial cable or other supply structure, and the transmission signal traverses a substrate portion to divide the transmission signal through a corporate feed-style network resulting in multiple transmission lines that feed multiple super elements. Each super element includes a transmission line having a plurality of slots. The transmission signal radiates through these slots in the super elements of the transmission array structure 424 to the radiating array structure 426, which includes an array of meta-structure or MTM elements positioned proximate the super elements. In some implementations, the array of MTM elements is overlaid on the super elements, however, a variety of configurations may be implemented. The super elements effectively feed the transmission signal to the array of MTM elements, from which the transmission signal radiates. Control of the array of MTM elements results in a directed signal or beamform.

As described in the present disclosure, a reactance control mechanism (e.g., RCM 420) is incorporated to adjust the effective reactance of a transmission line and/or a radiating element fed by a transmission line. In some implementations, the RCM 420 includes a varactor that changes the phase of a signal. In other implementations, alternate control mechanisms are used. The RCM 420 may be, or include at least a portion of, a varactor diode having a bias voltage applied by a controller (not shown). The varactor diode may serve as a variable capacitor when a reverse bias voltage is applied. As used herein, the term "reverse bias voltage" is also referred to herein as "reactance control voltage" or "varactor voltage." The value of the reactance, which in this case is capacitance, is a function of the reverse bias voltage value. By changing the reactance control voltage, the capacitance of the varactor diode is changed over a given range of values. Alternate implementations may use alternate methods for changing the reactance, which may be electrically or mechanically controlled. In some implementations, the varactor diode also may be placed between conductive areas of a radiating element. With respect to the radiating element, changes in varactor voltage produce changes in the effective capacitance of the radiating element. The change in effective capacitance changes the behavior of the radiating element and in this way the varactor diode may be considered as a tuning element for the radiating elements in beam formation.

In some implementations, the radiating array structure 426 is coupled to the antenna controller 412, the central processing unit 402, and the transceiver 410. The transmission signal controller 408 generates the specific transmission signal, such as a FMCW signal, which is used as for radar sensor applications as the transmitted signal is modulated in frequency, or phase. The FMCW transmitter signal enables radar to measure range to an object by measuring the phase differences in phase or frequency between the transmitted signal and the received signal, or reflected signal. Other modulation types may be incorporated according to the desired information and specifications of a system and application. Within FMCW formats, there are a variety of modulation patterns that may be used within FMCW, including sinusoidal, triangular, sawtooth, rectangular and so forth, each having advantages and purposes. For example, sawtooth modulation may be used for large distances to a target; a triangular modulation enables use of the Doppler frequency, and so forth. The received information is stored in the memory storage unit 428, in which the information structure may be determined by the type of transmission and modulation pattern. Other modulation schemes may be employed to achieve desired results. The transmission signal controller 408 may generate a cellular modulated signal, such as an Orthogonal Frequency Division Multiplexing (OFDM) signal. The transmission feed structure may be used in a variety of systems. In some systems, the transmission signal is provided to the antenna system 400 and the transmission signal controller 408 may act as an interface, translator or modulation controller, or otherwise as required for the transmission signal to propagate through a transmission line network of the feed distribution module 416.

Continuing with FIG. 4, the radiating structure 440 includes the radiating array structure 426, composed of individual radiating elements discussed herein. The radiating array structure 426 may take a variety of forms and is designed to operate in coordination with the transmission array structure 424, in which individual radiating elements, depicted as unit cell element 445, correspond to elements within the transmission array structure 424. As used herein, the "unit cell element" is referred to as an "MTM unit cell"

or "MTM element," and these terms are used interchangeably throughout the present disclosure without departing from the scope of the subject technology. The MTM unit cells include a variety of conductive structures and patterns, such that a received transmission signal is radiated therefrom. The MTM unit cell may serve as an artificial material, meaning a material that is not naturally occurring. Each MTM unit cell has some unique properties. These properties include a negative permittivity and permeability resulting in a negative refractive index; these structures are commonly referred to as Left-Handed Materials (LHM). The use of LHM enables behavior not achieved in classical structures and materials. The MTM array is a periodic arrangement of unit cells that are each smaller than the transmission wavelength. One implementation is illustrated in which the radiating array structure 426 is an 8×46 cell array, in which each of the unit cell elements 445 has a uniform size and shape; however, alternate and other implementations may incorporate different sizes, shapes, configurations and array sizes.

As seen in the present disclosure, interesting effects may be observed in propagation of electromagnetic waves, or transmission signals. Metamaterials can be used for several interesting devices in microwave and terahertz engineering such as antennas, sensors, matching networks, and reflectors, such as in telecommunications, automotive and vehicular, robotic, biomedical, satellite and other applications.

In the system 400 of FIG. 4, the impedance matching element 418 and the reactance control element 420 are implemented to improve performance, reduce signal losses and so forth. In some implementations, the RCM 420 includes a capacitance control mechanism controlled by the antenna controller 412 to control the phase of a transmission signal as it radiates from radiating array structure 426. In some implementations, the antenna controller 412 determines a voltage matrix to apply to the reactance control mechanisms within the RCM 420 to achieve a given phase shift or other antenna parameters. In some implementations, the radiating array structure 426 is adapted to transmit a directional beam without incorporating digital beam forming techniques, but rather through active control of the reactance parameters of the individual unit cell elements 445 that make up the radiating array structure 426.

In a radar implementation, the antenna controller 412 receives information from within the antenna system 400. As illustrated in FIG. 4, information is provided from the radiating structure 440 and from the interface-to-sensor fusion 404 to a sensor fusion module (not shown). In some implementations, the sensor fusion module is communicably coupled to the AI module 450. The AI module 450 can assist in detection, classification and identification of detected objects, and understanding of the environment within which the radar operates. This implementation depicts a vehicular control system, but is applicable in other fields and applications as well. In a vehicular control system, the sensor fusion module can receive information (digital and/or analog form) from multiple sensors and can interpret that information, making various inferences and initiating actions accordingly. One such action is to provide information to the antenna controller 412, in which that information may be the sensor information or may be an instruction to respond to sensor information. The sensor information may provide details of an object detected by one or more sensors, including the object's range, velocity, acceleration, and so forth. The sensor fusion module may detect an object at a location and instruct the antenna controller 412 to focus a beam on that location. The antenna controller 412 then responds by controlling the transmission beam through the reactance control module 420 and/or other control mechanisms for the radiating structure 440. The instruction from the antenna controller 412 acts to control generation of radiation beams, in which a radiation beam may be specified by antenna parameters such as beam width, transmit angle, transmit direction and so forth.

The transceiver 410 prepares a signal for transmission, such as a signal for a radar device, in which the signal is defined by modulation and frequency. The signal is received by each unit cell element 445 of the radiating array structure 426 and the phase of the radiating array structure 426 is adjusted by the antenna controller 412. In some implementations, transmission signals are received by a portion, or subarray, of the radiating array structure 426. The radiating array structure 426 may be applicable to many applications, including radar and cellular antennas. The subject technology considers an application in autonomous vehicles, such as an on-board sensor to detect objects in the environment of the vehicle. Alternate implementations may use the subject technology for wireless communications, medical equipment, sensing, monitoring, and so forth. Each application type incorporates designs and configurations of the elements, structures and modules described herein to accommodate their needs and goals.

In the antenna system 400, a signal is specified by the antenna controller 412, which may be in response to prior signals processed by an Artificial Intelligence (AI) module that is communicably coupled to the antenna system 400 over the communication bus 413. In other implementations, the signal may be provided from the interface-to-sensor fusion 404. In still other implementations, the signal may be based on program information from the memory storage unit 428. There are a variety of considerations to determine the beam formation, in which this information is provided to the antenna controller 412 to configure the various unit cell elements 445 of the radiating array structure 426. The transmission signal controller 408 generates the transmission signal and provides the transmission signal to the feed distribution module 416, which provides the signal to transmission array structure 424 and radiating array structure 426.

When the transmission signal is provided to the radiating structure 440, such as through a coaxial cable or other connector, the transmission signal propagates through the feed distribution module 416 to the transmission array structure 424 through which the transmission signal radiates to the radiating array structure 426 for transmission through the air. As depicted in FIG. 4, the transmission array structure 424 and the radiating array structure 426 are arranged side-by-side, however, the physical arrangement of the radiating array structure 426 relative to the transmission array structure 424 may be different depending on implementation.

The impedance matching element 418 and the reactance control module 420 may be positioned within the architecture of feed distribution module 416. In some implementations, or one or both may be external to the feed distribution module 416 for manufacture or composition as an antenna or radar module in other implementations. The impedance matching element 418 works in coordination with the reactance control module 420. The implementation illustrated in FIG. 4 enables phase shifting of radiating signals from radiating array structure 426. This enables a radar unit to scan a large area with the radiating array structure 426. For vehicle applications, sensors seek to scan the entire environment of the vehicle. These then may enable the vehicle to operate autonomously, or may provide driver assist functionality, including warnings and indicators to the driver, and controls to the vehicle.

Figure 5:
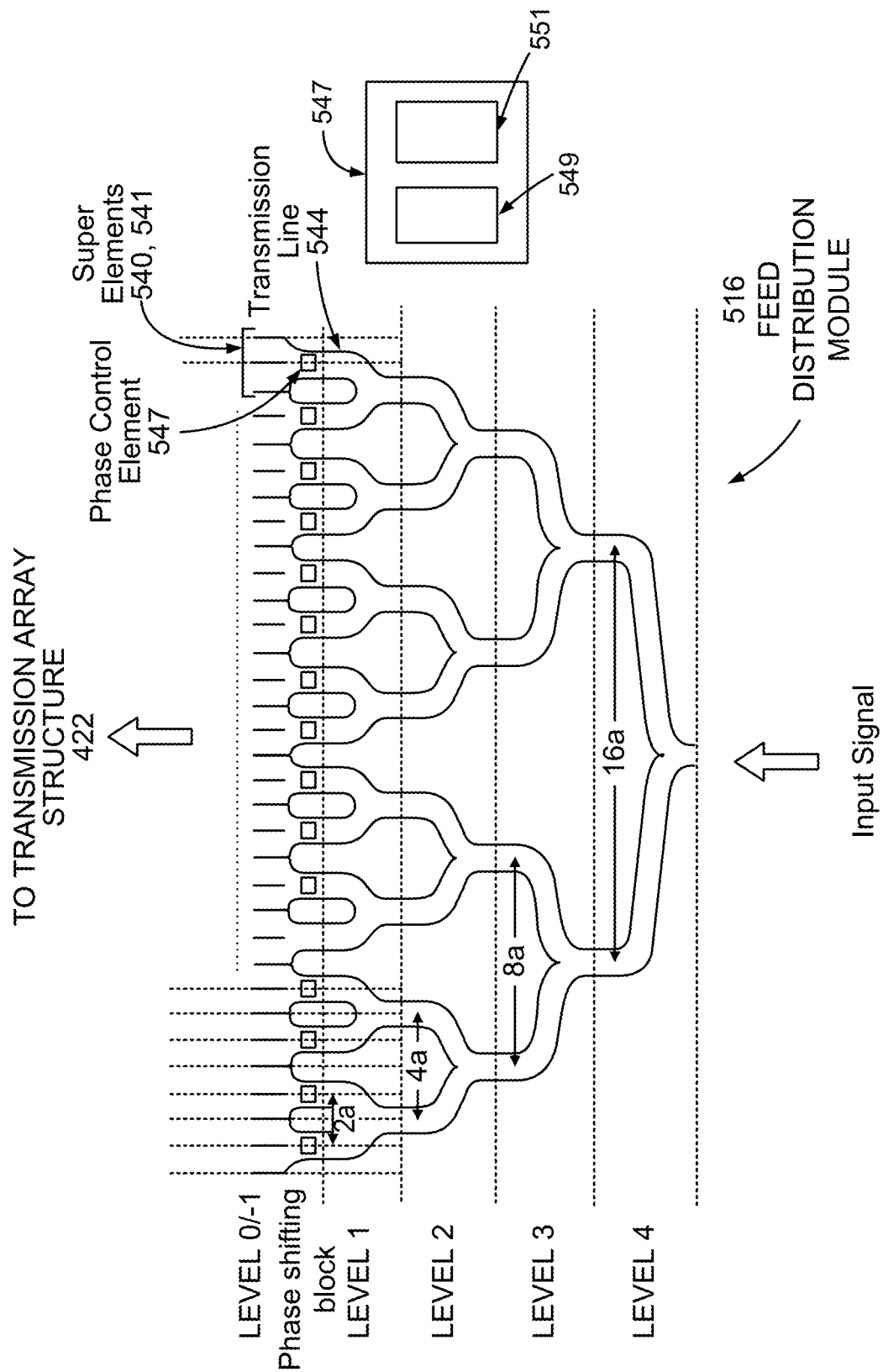
FIG. 5 illustrates a cross-sectional schematic diagram of the feed distribution structure for dividing transmission signals received for propagation to multiple super elements, according to implementations of the subject technology.

FIG. 5 illustrates a cross-sectional schematic diagram of a feed distribution module 516 that provides a corporate feed dividing the transmission signals received for propagation to multiple super elements (e.g., 540, 541), according to some implementations of the subject technology. In this implementation, the feed distribution module 516 is a type of power divider circuit. The input signal is fed in through the various paths. This configuration is an example and is not meant to be limiting to the specific structure disclosed.

Within the feed distribution module 516 is a network of paths, in which each of the division points is identified according to a division level. As depicted in FIG. 2, the feed distribution module 516 includes a first level of transmission lines (depicted as LEVEL 0), a second level of transmission lines (depicted as LEVEL 1), a third level of transmission lines (depicted as LEVEL 2), a fourth level of transmission lines (depicted as LEVEL 3), and a fifth level of transmission lines (depicted as LEVEL 4). The distance between two paths originating from a common division point may be fixed for other paths on a same level, but the distance between paths on other levels may be different. For example, the transmission lines split off from a common division point on LEVEL 5 may be separated by a first distance (depicted as 2a), whereas, the transmission lines split off from a common division point on LEVEL 2 may be separated by a second distance (depicted as 4a), which is greater than the first distance (or 2a). In another example, the transmission lines split off from a common division point on LEVEL 3 may be separated by a third distance (depicted as 8a) that is greater than the second distance (or 4a), whereas the transmission lines split off from a common division point on LEVEL 4 may be separated by a fourth distance (depicted as 16a), which is greater than the third distance (or 8a). In this implementation, the paths have similar dimensions; however, the size of the paths may be configured differently to achieve a desired transmission and/or radiation result. The transmission lines of the feed distribution module 516 may reside in a substrate of the radiating structure 440.

In some aspects, the transmission lines on LEVEL 0 include phase shifting blocks on respective transmission line paths. The feed distribution module 516 may include a phase shifting block on each transmission line on LEVEL 0. In some implementations, the phase shifting block includes a phase control module 547. In some aspects, the phase control module 547 may be positioned otherwise within the paths leading to one or more super elements. In some implementations, the phase control module 547 is incorporated into a transmission line 544. There are a variety of ways to couple the phase control module 547 to one or more transmission lines. As illustrated, the other paths of LEVEL 1 have reactance control mechanisms that may be the same as the phase control module 547.

As illustrated in FIG. 5, the transmission line 544 is located on LEVEL 5, which is the level of paths feeding one or more super elements of the transmission array structure 524. The transmission line 544 includes a phase control module 547 and is coupled to super elements 540 and 541. The phase control module 547 acts to change the reactance of the transmission line 544, resulting in a change to the signal propagating through the transmission line 544 to the super elements 540, 541. The phase control module 547 also can affect both super elements. In operation, the feed distribution module 516 receives input signals, which propagate through the network of paths to the transmission array structure 524.

As signals propagate through the transmission line 544 and the phase control module 547, the propagating signals may be proximate to other active circuitry, conductive traces and structures. To avoid any negative effects, the phase control module 547 includes a phase control structure 549 and a parasitic removal structure 551. In some implementations, the phase control structure 549 includes high frequency component isolation such that phase shifting can be provided to transmission lines while mitigating parasitic effects on the transmission lines. For example, an isolation structure may be positioned at a length that corresponds to the wavelength of the transmission line 544 (e.g., $\lambda/4$) where conductive traces to/from active circuitry may be proximate to the transmission lines (e.g., $\lambda/4$). In this respect, any potential cross-over effects between the activity circuitry conductive traces and transmission lines are mitigated.

Figure 6:
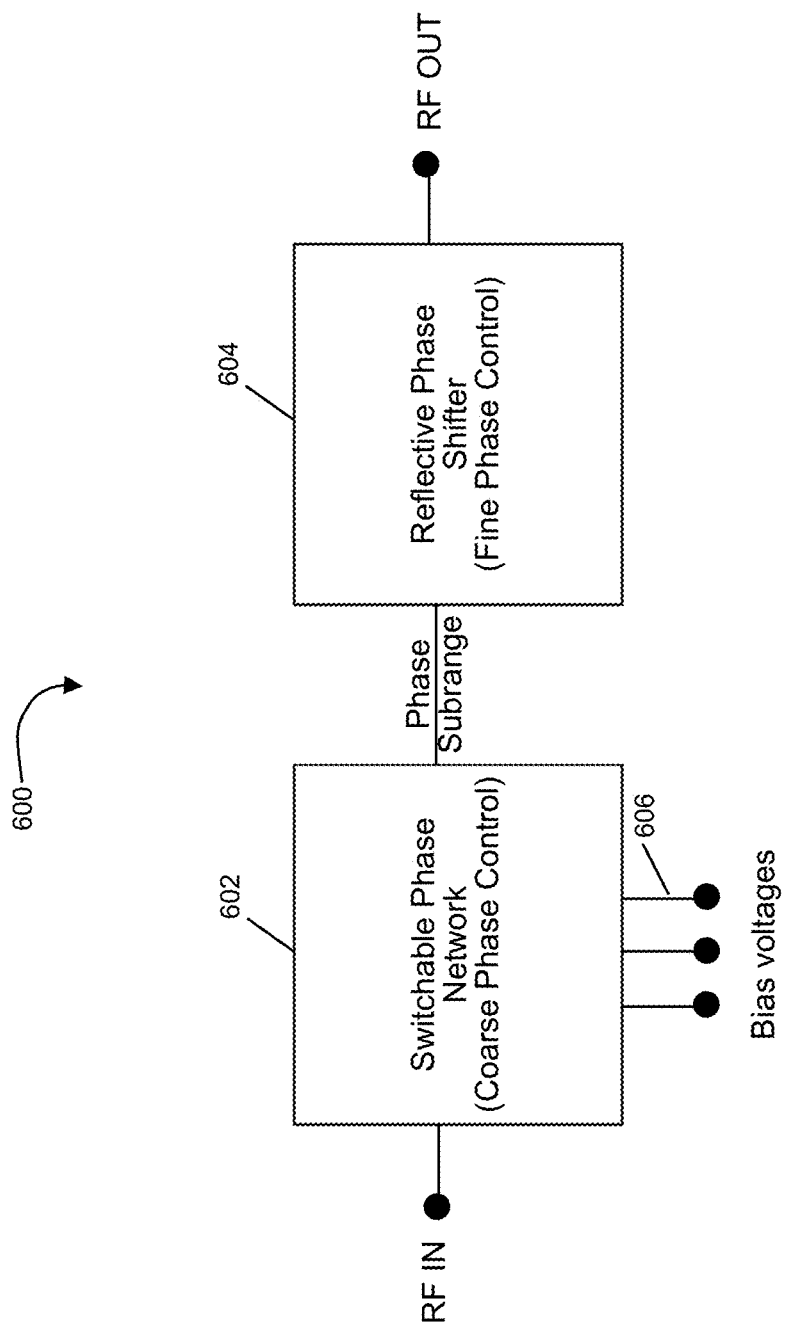
FIG. 6 illustrates a schematic diagram of a phase control module for millimeter wave applications, according to implementations of the subject technology.

FIG. 6 is a schematic diagram of a phase control module 600 for millimeter wave applications in accordance with various examples. The phase shift network 600 may include a switchable phase network 602 and a reflective phase shifter 604. Switchable phase network 602 includes delay lines and switches to enable phase shifts in the reflective phase shifter 604 in a set of phase subranges, such as, for example 90° phase subranges, 120° phase subranges, and so on. A set of bias voltages 606 is used to activate the switches in the switchable phase network 602. Each bias voltage activates a given switch and enables phase shifts in a given phase subrange. Reflective phase shifter 604 is designed to generate phase shifts in each subrange. In various examples, reflective phase shifter 604 is implemented with a set of varactors to achieve continuous phase shifts for a set of varactor control voltages.

A varactor may be a variable capacitance diode whose capacitance varies with an applied varactor control or reverse bias voltage. By changing the value of the control voltage, the capacitance of the varactor is changed over a given range of values. The design of varactors for millimeter wave applications suffer from quality factor and tuning range limitations, with the quality factor falling well below desired levels. Varactors having a broad tuning range in the millimeter wave spectrum are therefore hard to achieve, thereby limiting their use in millimeter wave applications that may require a 360° phase shift to realize their full potential. An ideal varactor, i.e., a lossless non-linear reactance, has a given capacitance range of about 20 to 80 fF and no loss (Rs=0Ω). An ideal varactor can provide a phase shift in the range of about 52 to 126 degrees. In various applications where a full 360° phase shift is desired, this phase shift is not sufficient. Reflective phase shifter 604 provides a solution to this limited phase shift range problem by introducing a distributed varactor network.

In some implementations, the switchable phase network 602 includes high frequency component isolation such that phase shifting can be provided to transmission lines while mitigating parasitic effects on the transmission lines (e.g., signal propagating between RF IN and RF OUT). For example, an isolation structure may be positioned at a length that corresponds to the wavelength of a transmission line (e.g., $\lambda/4$) where conductive traces to/from active circuitry may be proximate to the transmission line. In this respect, any potential cross-over effects between the activity conductive traces and transmission line are mitigated.

Figure 7:
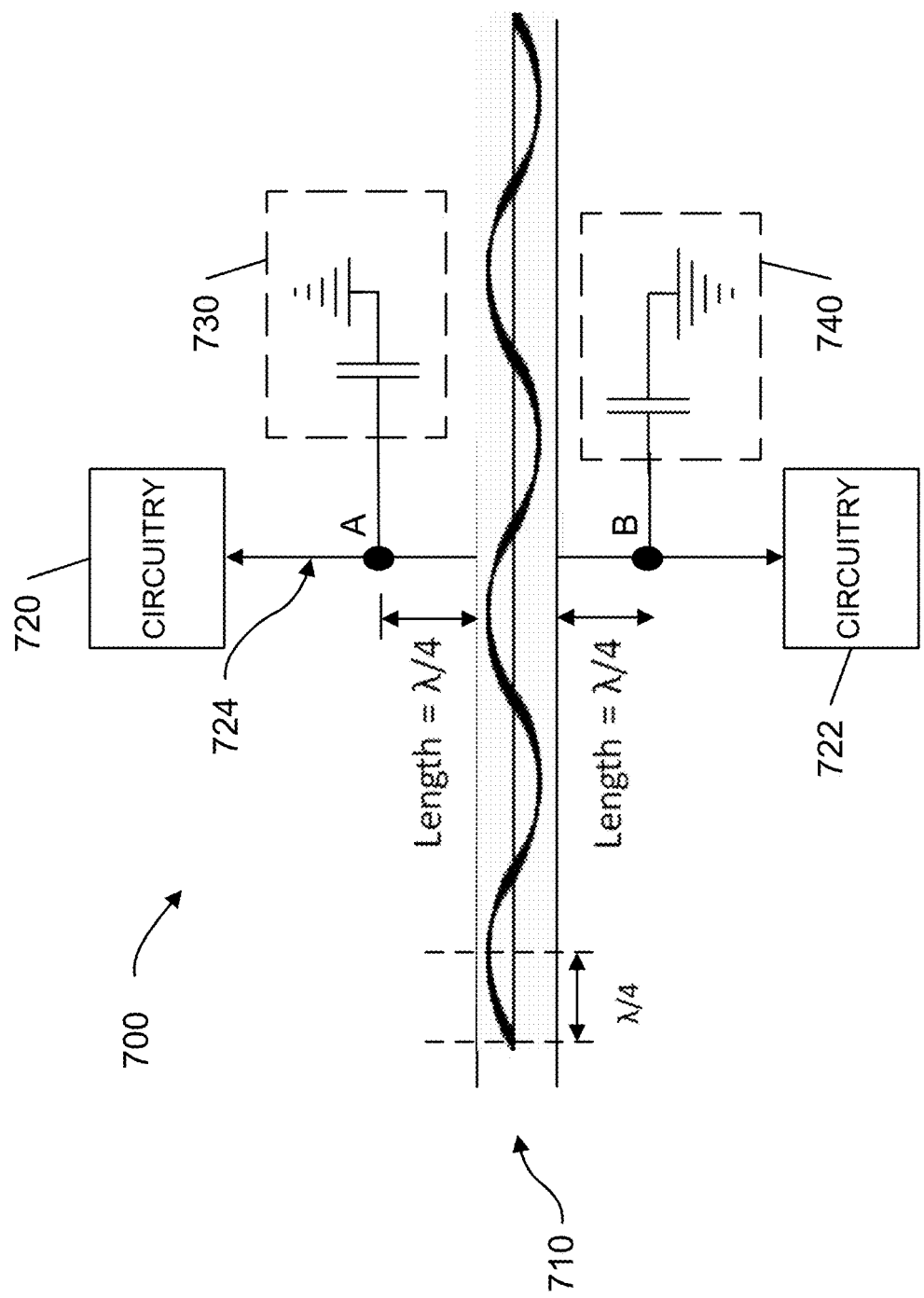
FIG. 7 illustrates a schematic diagram of an example of high frequency component isolation structures in a phase control module, according to implementations of the subject technology.

FIG. 7 illustrates a schematic diagram of an example of high frequency component isolation structures in a phase control module 700, according to implementations of the subject technology. The phase control module 700 may include any number of conductive traces, components, layers, vias and so forth, where unwanted parasitic effects may coexist. For example, placement of a conductive trace near a functional structure, such as an antenna, may fail to perform properly due to the interaction of the conductive portions with the transmission signal. As illustrated in FIG. 7, a transmission line 710 is positioned near circuitry 720 and circuitry 722, which are connected by a conductor 724. The conductor 724 is positioned proximate to the transmission line 710. To resolve and remove any parasitic capacitance or other effects onto the transmission line 710, isolation structures 730 and 740 are coupled to the conductor 724 at connection points A and B, respectively. For example, the isolation structures 730 and 740 may be positioned on opposite sides of the transmission line 710, and the isolation structures 730 and 740 may be equidistant from the transmission line 710. In some implementations, the isolation structures 730 and 740 are disposed on a first conductive layer (e.g., M1) different from a second conductive layer (e.g., M2) containing the conductor 724, where the M2 layer is disposed on a top surface of the M1 layer. In this respect, the isolation structures 730 and 740 are connected to the conductor 724 through vias (e.g., Through-Silicon Vias (TSVs)).

These isolation structures 730 and 740 are positioned such that the connection points A and B are each one quarter-wavelength (or $\lambda/4$) in distance from the transmission signal 710. In some implementations, the isolation structures 730 and 740 include a capacitor coupled to the conductor 724 and to ground. The value of the capacitor may correspond to a millimeter wave frequency (e.g., 77 GHz) such that a virtual RF ground can be observed at the connection points A and B. In this respect, the length of the distance between the connection point and transmission line 710 can dissipate the negative parasitic effects as the isolation structures 730 and 740 are seen as open circuits at the quarter-wavelength distance.

Figure 8:
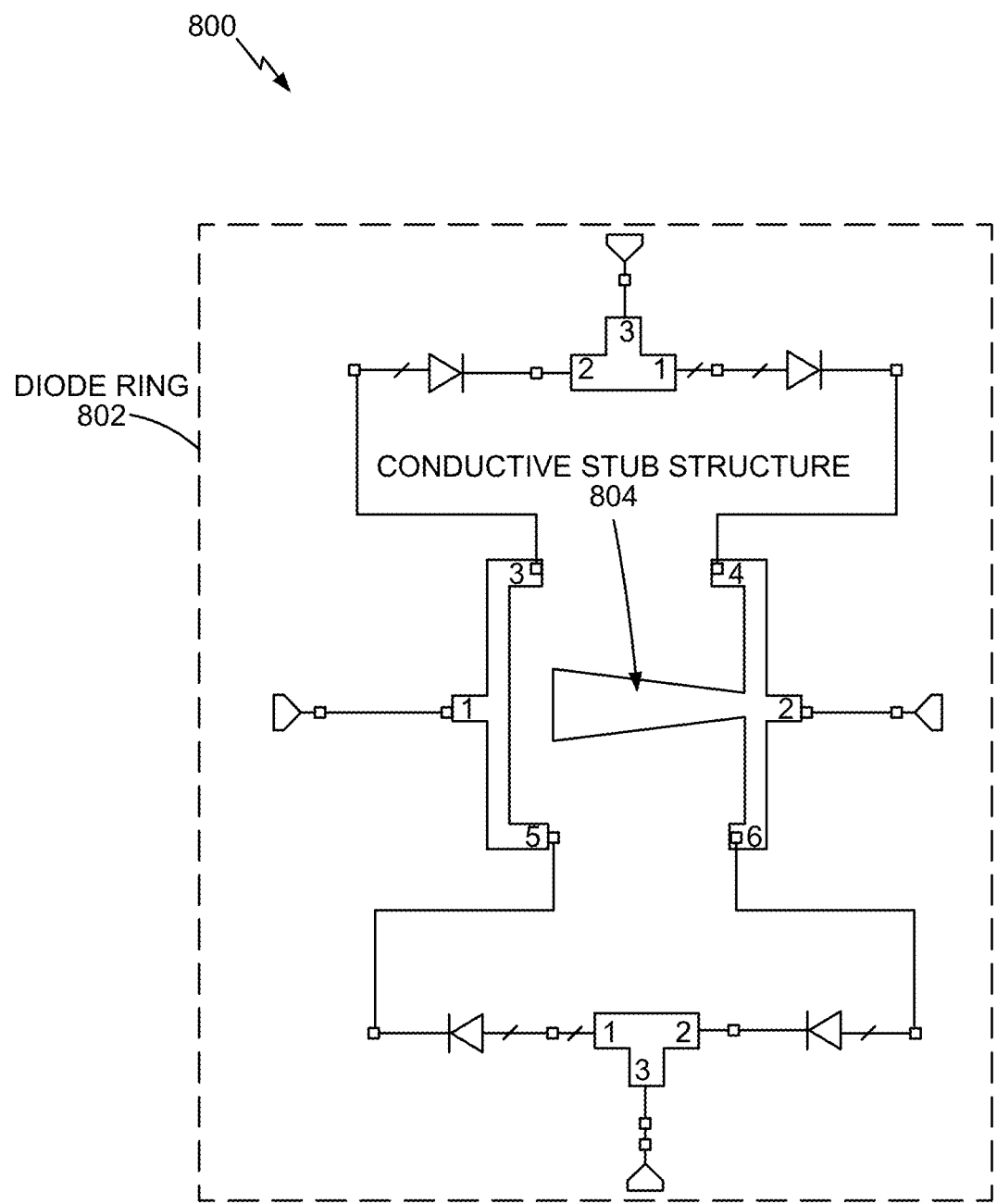
FIG. 8 illustrates a schematic diagram of another example of a high frequency component isolation structure in a phase control module, according to implementations of the subject technology.

FIG. 8 illustrates a schematic diagram of another example of a high frequency component isolation structure in a phase control module 800, according to implementations of the subject technology, according to implementations of the subject technology. The phase control module 800 may incorporate a mixer to serve as a phase shifter. The phase control module 800 includes a diode ring 802 for low frequency operation (e.g., less than 30 GHz). At higher frequencies (e.g., greater than 30 GHz), the diode ring 802 may not perform as intended, and thus impacts the operation of the phase control module 800. In some implementations, the diode ring 802 includes a conductive stub structure 804 positioned within the diode ring 802. The conductive stub structure 804 may mitigate any negative effects of the higher frequency operation, such as at 77 GHz. For example, the conductive stub structure 804 may cause a decrease in parasitic effects onto a transmission line that propagates through the diode ring 802.

Figure 9:
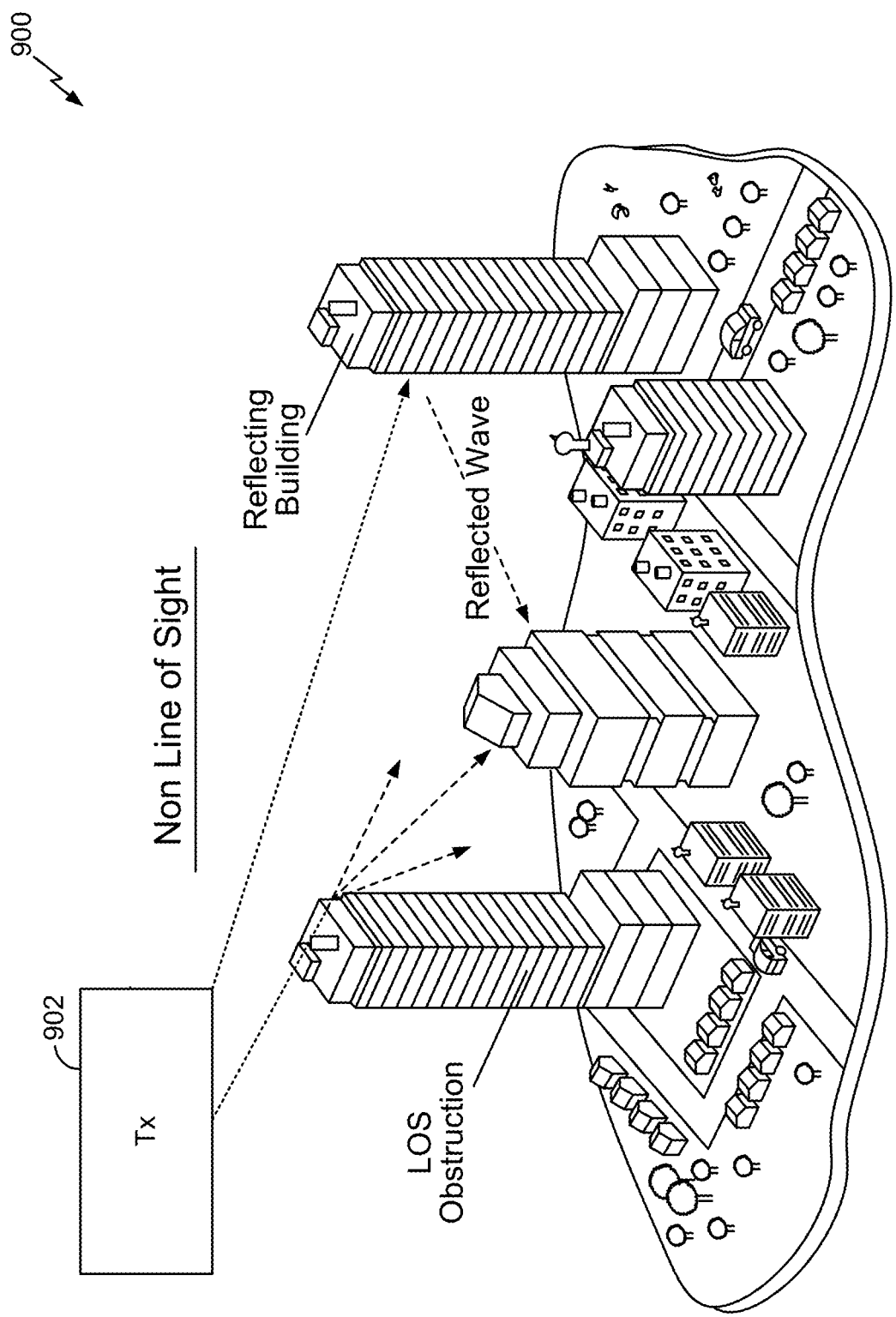
FIG. 9 illustrates an example of a wireless communication system application using a phase shifter with high frequency component isolation, according to implementations of the subject technology.

FIG. 9 illustrates an example of a wireless communication system application 900 using a phase shifter with high frequency component isolation, according to implementations of the subject technology. The wireless communication system application 900 includes a transmitter 902 for transmitting a cellular signal to a wireless communication environment, where the cellular signal is reflected from a reflecting building as a reflected wave signal onto other structures within the wireless communication environment. In some aspects, the cellular signal is transmitted by the transmitter 902 and the signal path of the cellular signal may be obstructed by a Line of Sight (LOS) obstruction, such as a building. In this respect, the transmitter 902 may include phase shifting for beam steering of the cellular signal. In some implementations, the transmitter 902 includes a phase shifting control module with high frequency component isolation for providing phase shifting to transmission lines within the transmitter 902 while mitigating parasitic effects on the transmission lines.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. Moreover, the separation of various system components in the aspects described above should not be understood as requiring such separation in all aspects, and it should be understood that the described program components and systems can generally be integrated together in a single hardware product or packaged into multiple hardware products. Other variations are within the scope of the following claim.

What is claimed is:

1. A radar system, comprising:
an array of radiating elements;
a plurality of transmission signal paths configured to deliver a transmission signal to radiating elements in the array of radiating elements; and
a phase control module coupled to one or more transmission signal paths of the plurality of transmission signal paths and configured to:
isolate the one or more transmission signal paths through the phase control module from at least one conductor electrically coupled to one or more active circuits in the phase control module, the at least one conductor proximate to the one or more transmission signal paths; and
adjust a reactance in the transmission signal propagating through the isolated one or more transmission signal paths to one or more radiating elements of the array of radiating elements,
wherein the phase control module comprises a first isolation structure that comprises a capacitor coupled to the at least one conductor and positioned proximate to the one or more transmission signal paths, wherein the capacitor has a millimeter wave frequency capacitance that causes a virtual ground to be present at a predetermined length to drive parasitic components associated with the conductor to ground.

2. The radar system of claim 1, wherein the first isolation structure is positioned at a distance of a quarter-wavelength to the one or more transmission signal paths.

3. The radar system of claim 1, wherein the first isolation structure is positioned on a first side of the one or more transmission signal paths, and
the phase control module comprises a second isolation structure positioned on a second side of the one or more transmission signal paths, the second side being opposite of the first side.

4. The radar system of claim 3, wherein the first isolation structure has a distance length from the one or more transmission signal paths that is equivalent to that of the second isolation structure.

5. The radar system of claim 1, wherein the first isolation structure is disposed on a first conductive layer different from a second conductive layer containing the at least one conductor, and wherein the second conductive layer is disposed on a top surface of the first conductive layer.

6. The radar system of claim 5, wherein the first isolation structure is connected to the at least one conductor using through-silicon vias.

7. A beamforming system, comprising:
a metamaterial (MTM) antenna array having a plurality of antenna subarrays; and
a reactance control module coupled to the MTM antenna array and configured to control a reactance behavior of unit cell elements in the plurality of antenna subarrays to change a phase behavior of a radiated signal delivered to the unit cell elements through a plurality of transmission signal paths, wherein the reactance control module comprises:
a phase control module coupled to the MTM antenna array and configured to:
isolate one or more transmission signal paths of the plurality of transmission signal paths through the phase control module from at least one conductor electrically coupled to one or more active circuits in the phase control module, the at least one conductor proximate to the one or more transmission signal paths; and
adjust a reactance in the radiated signal propagating through the isolated one or more transmission signal paths to the unit cell elements in the plurality of antenna subarrays,
wherein the phase control module comprises a first isolation structure positioned on a first side of the one or more transmission signal paths and a second isolation structure positioned on a second side of the one or more transmission signal paths, the second side being opposite of the first side.

8. The beamforming system of claim 7, wherein at least one of the first and second isolation structures is coupled to the at least one conductor and positioned proximate to the one or more transmission signal paths.

9. The beamforming system of claim 8, wherein at least one of the first and second isolation structures comprises a capacitor coupled to the at least one conductor and to ground.

10. The beamforming system of claim 7, wherein at least one of the first and second isolation structures is positioned at a distance of a quarter-wavelength to the one or more transmission signal paths.

11. The beamforming system of claim 9, wherein the capacitor has a millimeter wave frequency capacitance that causes a virtual ground to be present at a predetermined length to drive parasitic components associated with the conductor to ground.

12. The beamforming system of claim 7, wherein the phase control module comprises a varactor or a variable capacitor diode coupled to at least one of the first and second isolation structures to change a capacitance in
the isolated one or more transmission signal paths to a unit cell element in the MTM antenna array.

13. The beamforming system of claim 7, wherein the first isolation structure has a distance length from the one or more transmission signal paths that is equivalent to that of the second isolation structure.

14. The beamforming system of claim 7, wherein at least one of the first and second isolation structures is disposed on a first conductive layer different from a second conductive layer containing the at least one conductor, and wherein the second conductive layer is disposed on a top surface of the first conductive layer.

15. The beamforming system of claim 14, wherein the at least one of the isolation structures is connected to the at least one conductor using through-silicon vias.

16. A method of beamforming with high frequency component isolation, comprising:
- configuring an array of radiating elements into subarrays;
- configuring a plurality of transmission lines to deliver a transmission signal to the subarrays;
- isolating one or more transmission lines of the plurality of transmission lines from at least one conductor electrically coupled to one or more active circuits in a phase control module,
- wherein the phase control module comprises a first isolation structure positioned on a first side of the one or more transmission lines and a second isolation structure positioned on a second side of the one or more transmission lines, the second side being opposite of the first side;
- controlling a reactance behavior on the isolated one or more transmission lines to at least one radiating element in a subarray of the array of radiating elements with the phase control module; and
- determining a location of an object based on a measured signal intensity received at the array of radiating elements.

\* \* \* \* \*